United States Patent
Sugiura et al.

(10) Patent No.: US 7,445,866 B2
(45) Date of Patent: Nov. 4, 2008

(54) FUEL CELL STACK

(75) Inventors: Seiji Sugiura, Utsunomiya (JP); Jun Kondo, Utsunomiya (JP); Shigeru Inai, Tochigi-ken (JP); Hiromichi Yoshida, Tochigi-ken (JP); Hiroyuki Tanaka, Utsunomiya (JP); Naoki Mitsuta, Nasukarasuyama (JP)

(73) Assignee: Honda Motor Co., Ltd., Tokyo (JP)

( * ) Notice: Subject to any disclaimer, the term of this patent is extended or adjusted under 35 U.S.C. 154(b) by 348 days.

(21) Appl. No.: 11/285,985

(22) Filed: Nov. 23, 2005

(65) Prior Publication Data

US 2006/0110650 A1 May 25, 2006

(30) Foreign Application Priority Data

Nov. 25, 2004 (JP) .............................. 2004-339804
Aug. 1, 2005 (JP) .............................. 2005-222657

(51) Int. Cl.
*H01M 2/14* (2006.01)
*H01M 2/00* (2006.01)
*H01M 2/02* (2006.01)
*H01M 8/00* (2006.01)

(52) U.S. Cl. .............................. 429/39; 429/12; 429/34; 429/38

(58) Field of Classification Search .............. 429/34–39
See application file for complete search history.

(56) References Cited

U.S. PATENT DOCUMENTS

| | | | |
|---|---|---|---|
| 6,048,633 A * | 4/2000 | Fujii et al. | 429/32 |
| 6,723,463 B2 * | 4/2004 | Sugita et al. | 429/38 |
| 7,014,939 B2 * | 3/2006 | Suenaga et al. | 429/35 |
| 2003/0211376 A1 * | 11/2003 | Hatoh et al. | 429/32 |
| 2003/0219644 A1 | 11/2003 | Inai et al. | |
| 2004/0028987 A1 * | 2/2004 | Horiuchi | 429/38 |

FOREIGN PATENT DOCUMENTS

| | | |
|---|---|---|
| JP | 10-284096 | 10/1998 |
| JP | 2001-236975 | 8/2001 |
| JP | 2003-346869 | 12/2003 |
| JP | 2005-251604 | 9/2005 |

* cited by examiner

*Primary Examiner*—Dah-Wei Yuan
*Assistant Examiner*—Steven Scully
(74) *Attorney, Agent, or Firm*—Fish & Richardson P.C.

(57) ABSTRACT

A fuel cell stack includes a stack body, an end separator, a terminal plate, an insulating plate, and an end plate provided at one end of the stack body in a stacking direction. The insulating plate has a recess for accommodating the terminal plate. Further, the insulating plate has a bypass passage connected between a fuel gas supply passage and a fuel gas discharge passage outside the recess for discharging condensed water. An insulating seal member is provided on the end separator to cover the bypass passage. The condensed water flows through an insulated passage formed by the insulating seal member and the bypass passage.

10 Claims, 10 Drawing Sheets

FUEL CELL STACK

BACKGROUND OF THE INVENTION

1. Field of the Invention

The present invention relates to a fuel cell stack comprising a stack body formed by stacking a plurality of electrolyte electrode assemblies and separators alternately in a stacking direction. Each of the electrolyte electrode assemblies includes a pair of electrodes, and an electrolyte interposed between the electrodes. A reactant gas supply passage and a reactant gas discharge passage for at least one reactant gas extend through the stack body in the stacking direction. The fuel cell stack further comprises terminal plates, insulating plates, and end plates provided at opposite ends of the stack body.

2. Description of the Related Art

In general, a polymer electrolyte fuel cell employs a membrane electrode assembly (electrolyte electrode assembly) which includes an anode, a cathode, and an electrolyte membrane (electrolyte) interposed between the anode and the cathode. The electrolyte membrane is a solid polymer ion exchange membrane. The membrane electrode assembly and separators sandwiching the membrane electrode assembly make up a unit of a power generation cell for generating electricity. Normally, a predetermined number of membrane electrode assemblies and separators are stacked together alternately to form a fuel cell stack.

In the power generation cell, a fuel gas such as a gas chiefly containing hydrogen (hereinafter also referred to as the "hydrogen-containing gas") is supplied to the anode. A gas chiefly containing oxygen or air (hereinafter also referred to as the "oxygen-containing gas") is supplied to the cathode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating a DC electrical energy.

In general, an oxygen-containing gas supply passage and a fuel gas supply passage (reactant gas supply passages) extend through the fuel cell stack in the stacking direction for supplying the oxygen-containing gas and the fuel gas as reactant gases to the cathode and the anode. Further, an oxygen-containing gas discharge passage and a fuel gas discharge passage (reactant gas discharge passages) extend through the fuel cell stack in the stacking direction for discharging the fuel gas and the oxygen-containing gas from the cathode and the anode.

In particular, water produced in the reaction in the power generation surfaces of the electrodes tends to flow into the oxygen-containing gas discharge passage, and the water is often retained in the oxygen-containing gas discharge passage. The water produced in the power generation reaction flows into the fuel gas discharge passage by back diffusion, and water condensation occurs in the fuel gas discharge passage. Therefore, the water is also retained in the fuel gas discharge passage.

At the time of starting, or restarting operation of the fuel cell stack, if the temperature of the pipe for supplying the oxygen-containing gas or the fuel gas is decreased, water condensation may occur. Thus, the condensed water flows into the oxygen-containing gas supply passage or the fuel gas supply passage. Further, the oxygen-containing gas and the fuel gas supplied to the fuel cell stack may be humidified beforehand to prevent the electrolyte membrane from being dried. Thus, the oxygen-containing gas discharge passage and the fuel gas discharge passage are narrowed or closed by the retained water. The flows of the oxygen-containing gas and the fuel gas are disturbed, and the power generation performance is degraded.

In an attempt to address the problem, for example, a polymer electrolyte fuel cell disclosed in Japanese Laid-Open Patent Publication No. 10-284096 is known. As shown in FIG. 10, the fuel cell includes a separator 1. An inlet manifold 2a is provided at an upper portion of the separator 1, and an outlet manifold 2b is provided at a lower portion of the separator 1. The inlet manifold 2a and the outlet manifold 2b are connected by a plurality of gas flow grooves 3 extending vertically.

A gas inlet 4a is connected to the inlet manifold 2a, and a gas outlet 4b is connected to the outlet manifold 2b. A branched gas groove 5 is formed in the separator 1. The branched gas groove 5 extends downwardly from the gas inlet 4a, and is curved in the horizontal direction toward the gas outlet 4b.

When water droplets are mixed with the reactant gas flowing from the gas inlet 4a, the gas droplets are guided by the branched gas groove 5 extending downwardly from the gas inlet 4a. According to the disclosure, in this structure, the water droplets are discharged into the gas outlet 4b. As a result, the amount of water droplets contained in the reactant gas supplied to the gas flow grooves 3 is reduced significantly, and it is possible to prevent degradation of the power generation performance.

However, in the conventional technique, the branched gas groove 5 functioning as a bypass passage is positioned outside the gas flow grooves 3 of the separator 1, i.e., outside the power generation surface. Therefore, the area of the separator 1 cannot be effectively utilized as the power generation surface. Thus, it is not possible to efficiently reduce the overall size of the fuel cell stack.

SUMMARY OF THE INVENTION

A main object of the present invention is to provide a fuel cell stack having a simple and economical structure in which it is possible to maintain the desired power generation performance.

The present invention relates to a fuel cell stack comprising a stack body formed by stacking a plurality of electrolyte electrode assemblies and separators alternately in a stacking direction. Each of the electrolyte electrode assemblies includes a pair of electrodes, and an electrolyte interposed between the electrodes. A reactant gas supply passage and a reactant gas discharge passage for at least one reactant gas extend through the stack body in the stacking direction. The fuel cell stack further comprises terminal plates, insulating plates, and end plates provided at opposite ends of the stack body.

A bypass passage is formed between the stack body and the end plate, and the bypass passage is connected between the reactant gas supply passage and the reactant gas discharge passage. The bypass passage is covered with an insulating seal member.

Further, preferably, an end separator is provided at an end of the stack body, a recess for accommodating the terminal plate is provided at the center of the insulating plate, and the bypass passage is formed between the insulating plate and the end separator outside the recess. Thus, the number of components of the fuel cell stack is reduced effectively. The fuel cell stack is economical, and reduction in the size of the fuel cell stack is achieved easily.

Further, preferably, an end separator is provided at an end of the stack body, and the bypass passage is formed between the end separator and the stack body. Thus, the structure of the fuel cell stack is simplified effectively.

Further, preferably, the separator of the stack body has a seal member around a reactant gas flow field for supplying the reactant gas along an electrode surface, and the insulating seal member partially overlaps the seal member in the stacking direction. Therefore, the insulating seal member functions as a seal load receiver (back receiver), and the seal line is held by the insulating seal member suitably.

Further, preferably, a reactant gas flow field connected to the reactant gas supply passage and the reactant gas discharge passage for supplying the reactant gas to the electrode is provided, and water repellent treatment is applied to an inlet section for supplying the reactant gas from the reactant gas supply passage to the reactant gas flow field. It is also preferable that hydrophilic treatment is applied to a flow groove surface of the bypass passage.

According to the present invention, the bypass passage connected between the reactant gas supply passage and the reactant gas discharge passage is provided. Therefore, the condensed water is discharged through the bypass passage suitably. Further, the bypass passage is covered with the insulating seal member. That is, the condensed water flows through an insulated passage. Thus, it is possible to prevent short circuit between the power generation cells or electrical leakage to the outside through the condensed water. With a simple and compact structure, it is possible to maintain the desired power generation performance.

The above and other objects, features and advantages of the present invention will become more apparent from the following description when taken in conjunction with the accompanying drawings in which preferred embodiments of the present invention is shown by way of illustrative example.

DESCRIPTION OF THE PREFERRED EMBODIMENTS

Figure 1:
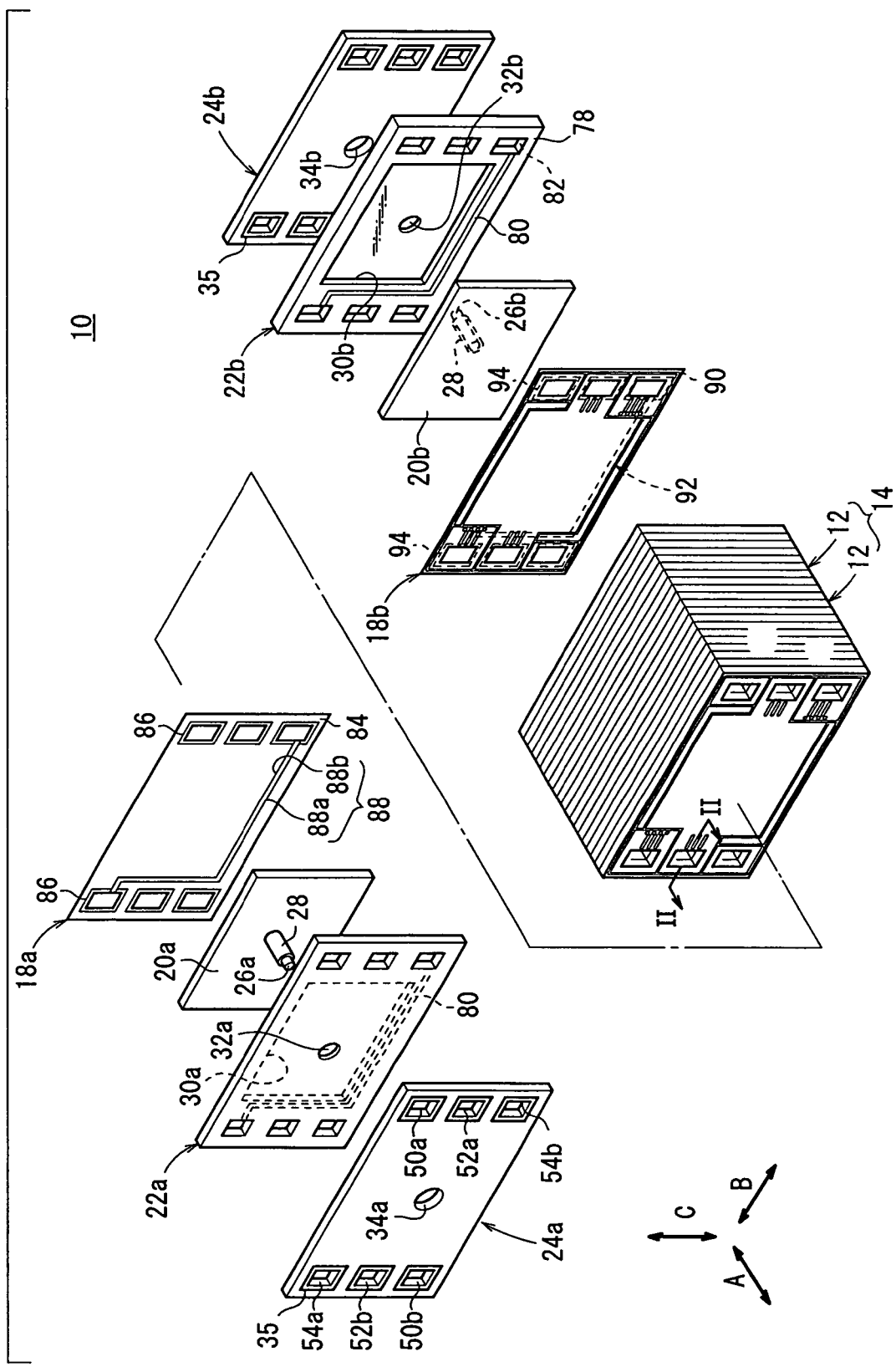
FIG. 1 is a partial exploded perspective view schematically showing a fuel cell stack according to a first embodiment of the present invention.
Figure 2:
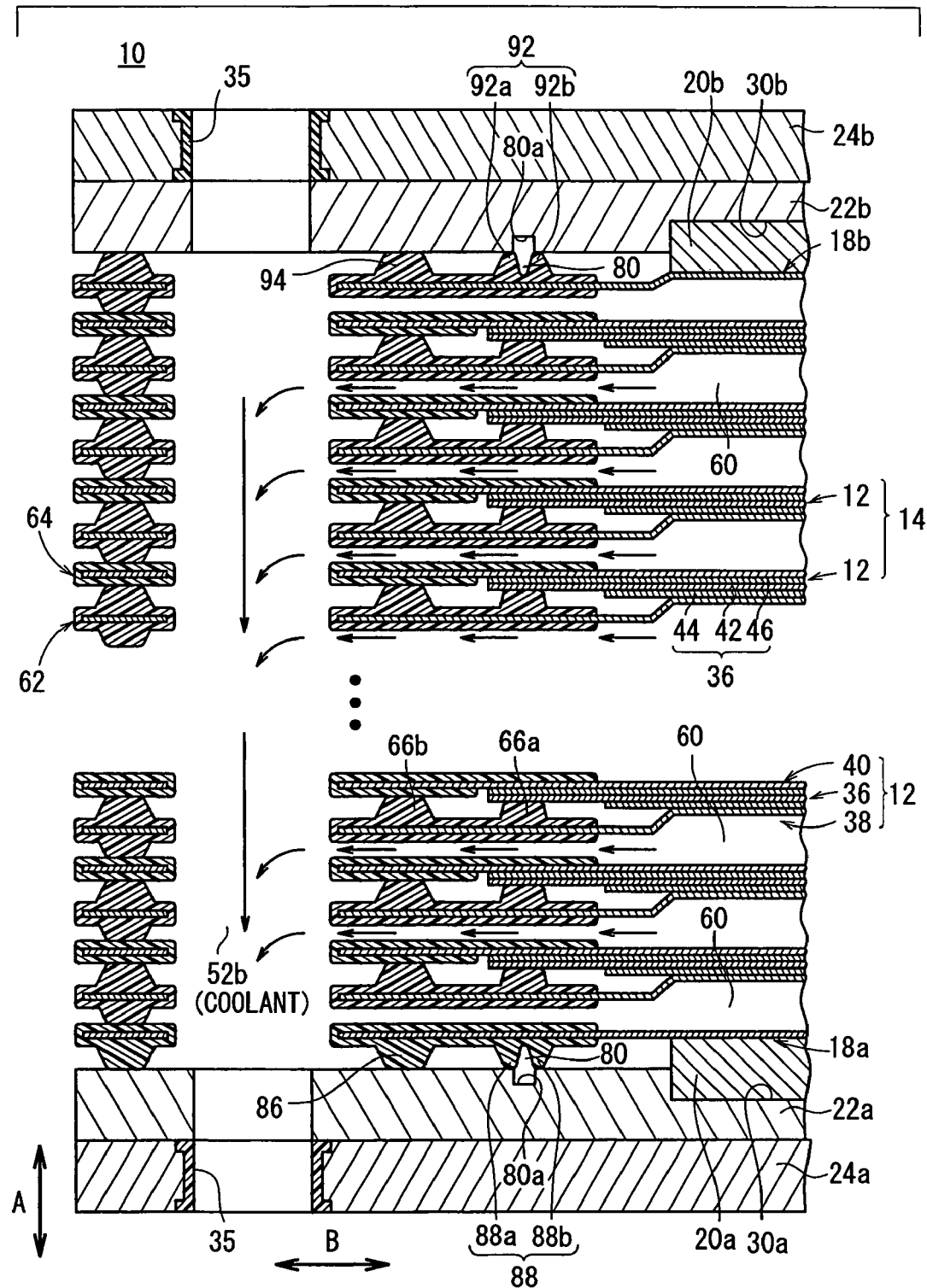
FIG. 2 is a cross sectional view showing the fuel cell stack, taken along a line II-II in FIG. 1.

FIG. 1 is a partial exploded perspective view showing a fuel cell stack 10 according to a first embodiment of the present invention. FIG. 2 is a cross sectional view showing the fuel cell stack 10, taken along a line II-II in FIG. 1.

The fuel cell stack 10 includes a stack body 14 formed by stacking a plurality of power generation cells 12 in a stacking direction indicated by the arrow A. At one end of the stack body 14 in the stacking direction indicated by the arrow A, an end separator 18a is provided. A terminal plate 20a is provided outside the end separator 18a. An insulating plate 22a is provided outside the terminal plate 20a. Further, an end plate 24a is provided outside the insulating plate 22a. At the other end of the stack body 14 in the stacking direction indicated by the arrow A, an end separator 18b is provided. A terminal plate 20b is provided outside the end separator 18b. An insulating plate 22b is provided outside the terminal plate 20b. Further, an end plate 24b is provided outside the insulating plate 22b.

For example, the fuel cell stack 10 is placed in a box-shaped casing (not shown) including the rectangular end plates 24a, 24b. Alternatively, components of the fuel cell stack 10 may be tightened together by a plurality of tie rods (not shown) extending in the direction indicated by the arrow A.

A terminal 26a is provided at substantially the center of the terminal plate 20a, and a terminal 26b is provided at substantially the center of the terminal plate 20b. The terminals 26a, 26b are inserted into insulating cylinders 28 and extend outwardly from the end plates 24a, 24b, respectively. For example, the insulating plates 22a, 22b are made of insulating material such as polycarbonate (PC) or phenol resin.

A rectangular recess 30a is formed at the center of the insulating plate 22a, and a rectangular recess 30b is formed at the center of the insulating plate 22b. A hole 32a is formed at substantially the center of the recess 30a, and a hole 32b is formed at substantially the center of the recess 30b. The terminal plates 20a, 20b are placed in the recesses 30a, 30b, respectively. The terminals 26a, 26b of the terminal plates 20a, 20b are inserted into the holes 32a, 32b through the insulating cylinders 28, respectively.

A hole 34a is formed at substantially the center of the end plate 24a, and a hole 34b is formed at substantially the center of the end plate 24b. The holes 34a, 34b are coaxial with the holes 32a, 32b, respectively. Insulating grommets 35 are attached to the end plates 24a, 24b, around the inner surfaces of an oxygen-containing gas supply passage 50a, a coolant supply passage 52a, a fuel gas discharge passage 54b, a fuel gas supply passage 54a, a coolant discharge passage 52b, and an oxygen-containing gas discharge passage 50b as described later.

Figure 3:
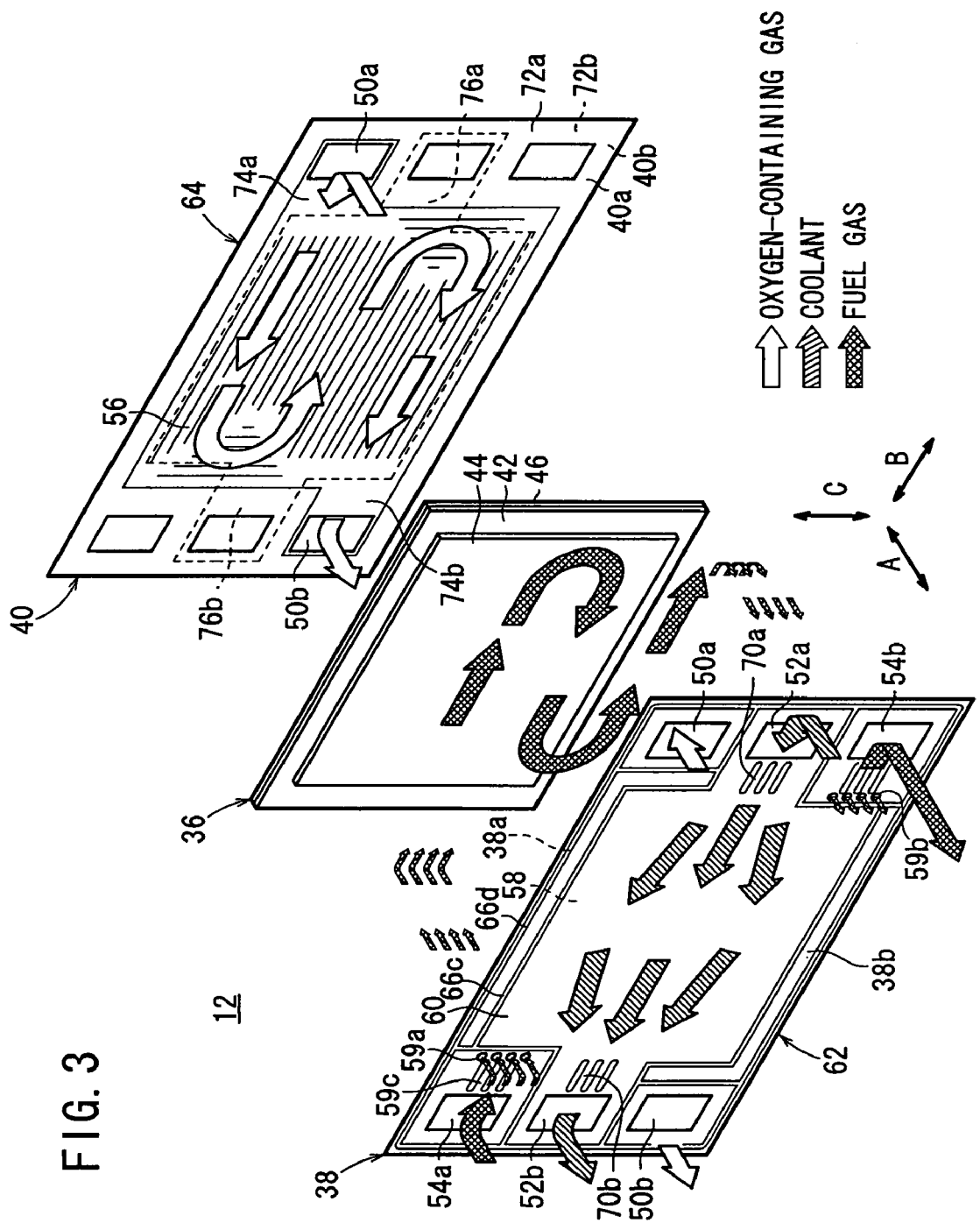
FIG. 3 is an exploded perspective view showing a power generation cell of the fuel cell stack.

As shown in FIG. 3, the power generation cell 12 includes a membrane electrode assembly 36 and first and second metal separators 38, 40 sandwiching the membrane electrode assembly 36. For example, the first and second metal separators 38, 40 are steel plates, stainless steel plates, aluminum plates, or plated steel sheets. The first and second metal separators 38, 40 may be fabricated by press forming of metal plates having anti-corrosive surfaces formed by surface treatment. Alternatively, carbon members or the like may be used.

The membrane electrode assembly 36 includes an anode 44, a cathode 46, and a solid polymer electrolyte membrane (electrolyte) 42 interposed between the anode 44 and the cathode 46. The solid polymer electrolyte membrane 42 is formed by impregnating a thin membrane of perfluorosulfonic acid with water, for example. The surface area of the anode 44 is smaller than the surface area of the cathode 46.

Each of the anode 44 and the cathode 46 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 44 and the electrode catalyst layer of the cathode 46 are fixed to both surfaces of the solid polymer electrolyte membrane 42, respectively.

At one end of the power generation cell 12 in a horizontal direction indicated by an arrow B in FIG. 1, the oxygen-containing gas supply passage 50a for supplying an oxygen-containing gas such as air, the coolant supply passage 52a for supplying a coolant, and the fuel gas discharge passage 54b for discharging a fuel gas such as a hydrogen-containing gas are arranged vertically in a direction indicated by an arrow C.

At the other end of the fuel cell stack 10 in the direction indicated by the arrow B, the fuel gas supply passage 54a for supplying the fuel gas, the coolant discharge passage 52b for discharging the coolant, and the oxygen-containing gas discharge passage 50b for discharging the oxygen-containing gas are arranged vertically in the direction indicated by the arrow C.

The second metal separator 40 has an oxygen-containing gas flow field 56 on its surface 40a facing the membrane electrode assembly 36. The oxygen-containing gas flow field 56 comprises a plurality of grooves in a serpentine pattern for allowing the oxygen-containing gas to flow back and forth in the direction indicated by the arrow B, and move downwardly. The oxygen-containing gas flow field 56 is connected to the oxygen-containing gas supply passage 50a and the oxygen-containing gas discharge passage 50b.

Figure 4:
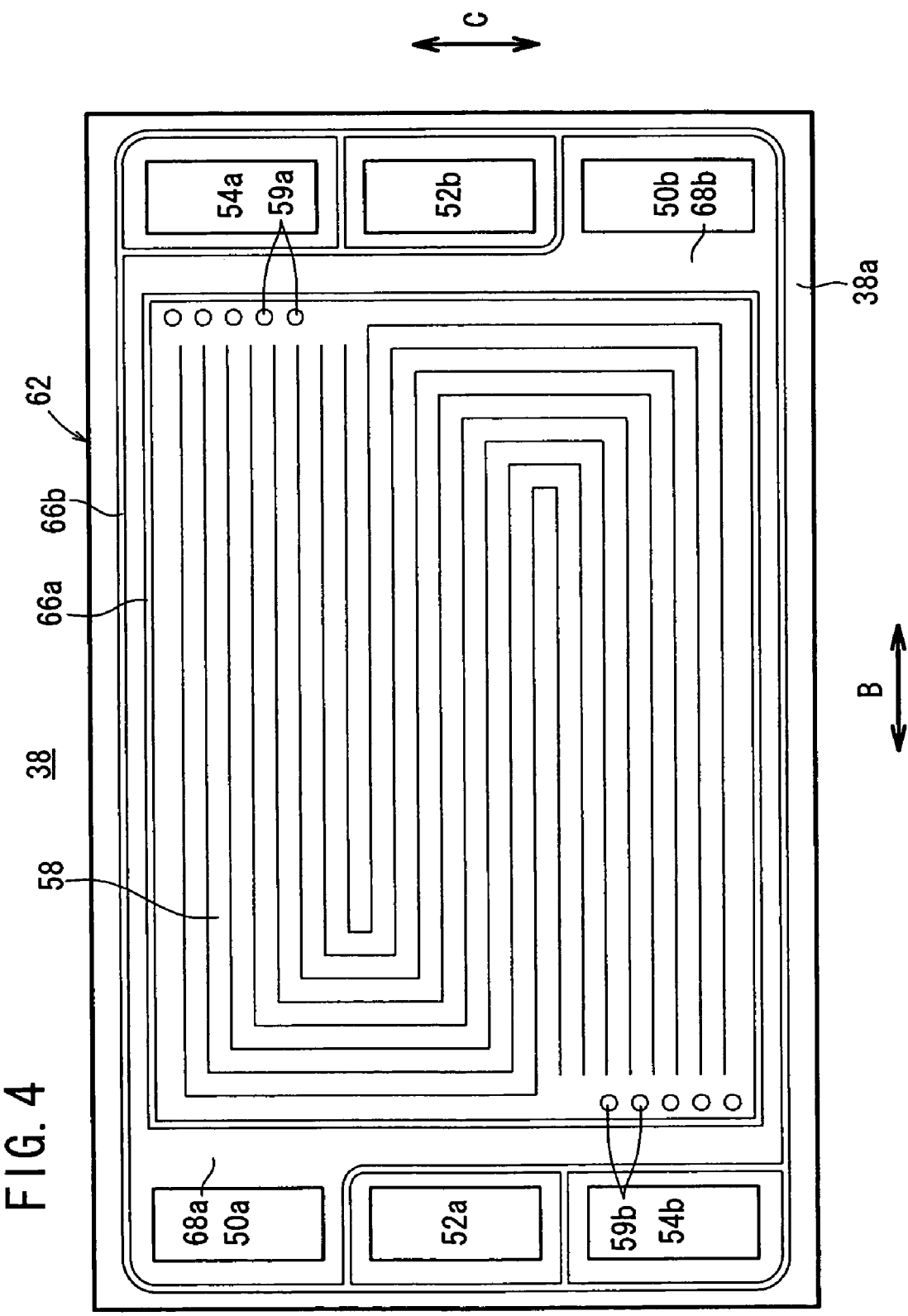
FIG. 4 is a front view showing a first metal separator of the power generation cell.

As shown in FIG. 4, the first metal separator 38 has a fuel gas flow field 58 on its surface 38a facing the membrane electrode assembly 36. The fuel gas flow field 58 comprises a plurality of grooves in a serpentine pattern for allowing the fuel gas to flow back and forth in the direction indicated by the arrow B, and move downwardly in the direction indicated by the arrow C. The first metal separator 38 has a plurality of supply holes 59a connecting the fuel gas supply passage 54a and the fuel gas flow field 58, and a plurality of discharge holes 59b connecting the fuel gas flow field 58 and the fuel gas discharge passage 54b.

As shown in FIG. 3, the first metal separator 38 has an inlet section 59c on its surface 38a, between the fuel gas supply passage 54a and the supply holes 59a for supplying the fuel gas into the supply holes 59a. Water repellent treatment is applied to the inlet section 59c. The water repellent treatment is performed, e.g., by covering the inlet section 59c with silicone rubber or fluorocarbon rubber. Alternatively, the water repellent treatment is performed by applying coating material to the inlet section 59c. For example, the water repellent material includes PTFE (polytetrafluoroethylene), FEP (perfluoro ethylene propylene), PFA (tetrafluoroethylene perfluoroalkoxy vinyl ether copolymer), or other fluorinated resin. Further, a first insulating member 62 as described later may have a coarse surface as the inlet section 59c, or a molding die for forming the first insulating member 62 may have a coarse surface. On the inlet section 59c, the water contact angle is 90° or more.

As shown in FIG. 3, a coolant flow field 60 is formed between a surface 38b of the first metal separator 38 and a surface 40b of the second metal separator 40. The coolant flow field 60 is connected to the coolant supply passage 52a and the coolant discharge passage 52b. For example, the coolant flow field 60 includes a plurality of grooves extending straight in the direction indicated by the arrow B.

As shown in FIGS. 2 to 4, the first insulating member 62 is formed integrally on the surfaces 38a, 38b of the first metal separator 38 around the outer end of the first metal separator 38, and a second insulating member 64 is formed integrally on the surfaces 40a, 40b of the second metal separator 40 around the outer end of the second metal separator 40.

The first and second insulating members 62, 64 are made of seal material, cushion material or packing material such as EPDM (Ethylene Propylene diene terpolymer), NBR (Nitrile Butadiene Rubber), fluoro rubber, silicone rubber, fluoro silicone rubber, butyl rubber (Isobutene-Isoprene Rubber), natural rubber, styrene rubber, chloroprene rubber, or acrylic rubber.

As shown in FIG. 4, the first insulating member 62 includes an inner seal 66a and an outer seal 66b formed integrally on the surface 38a of the first metal separator 38. The inner seal 66a is formed around the fuel gas flow field 58, the supply holes 59a, and the discharge holes 59b. The outer seal 66b is formed around the outer end of the surface 38a. The outer seal 66b forms a channel 68a connected to the oxygen-containing gas supply passage 50a, and a channel 68b connected to the oxygen-containing gas discharge passage 50b.

As shown in FIG. 3, the first insulating member 62 includes an inner seal 66c and an outer seal 66d formed integrally on the surface 38b of the first metal separator 38. The inner seal 66c is formed around the coolant flow field 60, the coolant supply passage 52a, and the coolant discharge passage 52b. The coolant flow field 60 is connected to the coolant supply passage 52a through a channel 70a, and connected to the coolant discharge passage 52b through a channel 70b. The inner seals 66a, 66c and the outer seals 66b, 66d substantially overlap each other such that the first metal separator 38 is sandwiched between the inner seals 66a, 66c and the outer seals 66b, 66d.

The second insulating member 64 includes a planar seal 72a formed integrally on the surface 40a of the second metal separator 40, and a planar seal 72b formed integrally on the surface 40b of the second metal separator 40. The planar seal 72a includes a step region 74a connecting the oxygen-containing gas supply passage 50a and the oxygen-containing gas flow field 56, and a step region 74b connecting the oxygen-containing gas discharge passage 50b and the oxygen-containing gas flow field 56. The planar seal 72b includes a step region 76a connecting the coolant supply passage 52a and the coolant flow field 60, and a step region 76b connecting the coolant discharge passage 52b and the coolant flow field 60.

Figure 5:
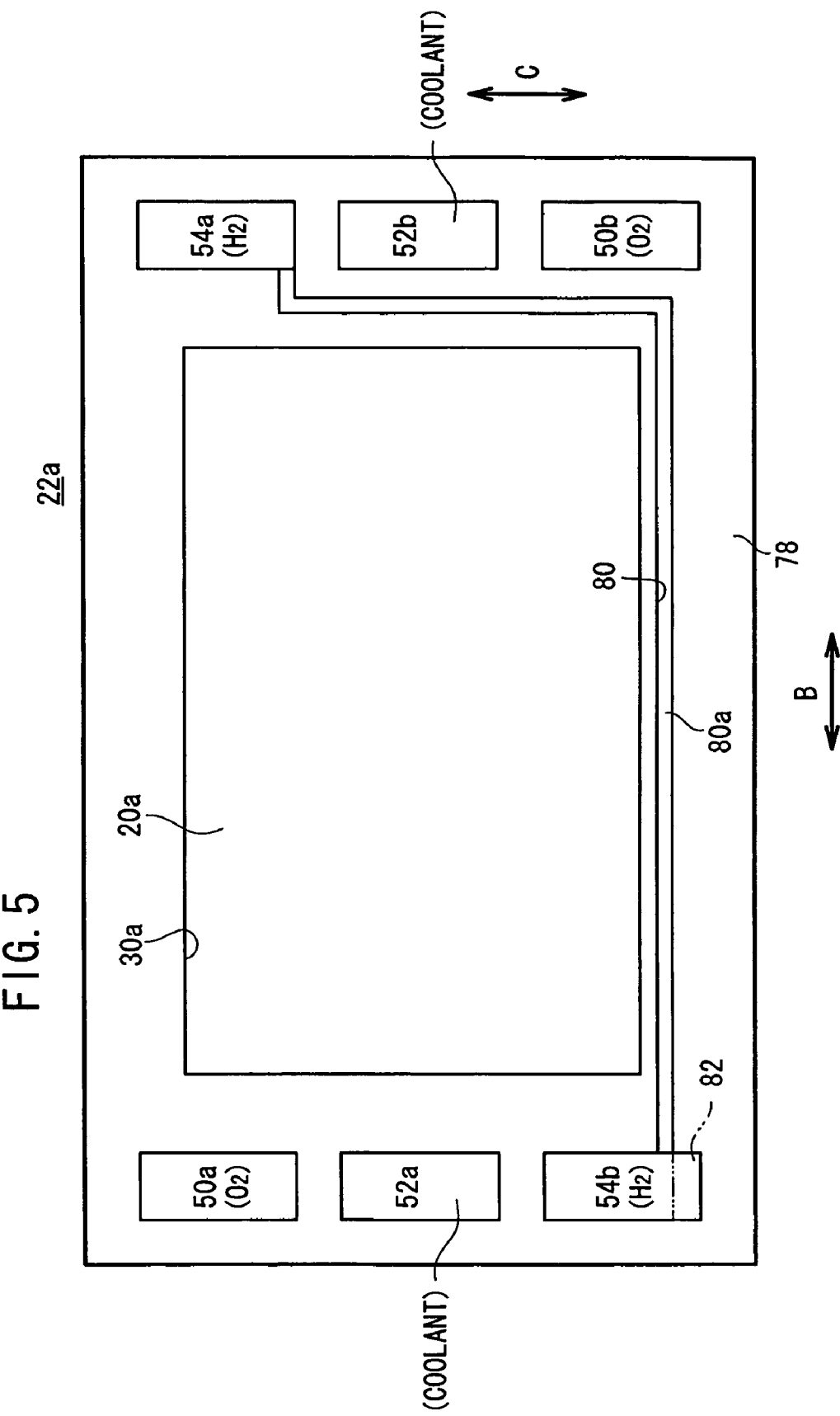
FIG. 5 is a front view showing an insulating plate of the fuel cell stack.

As shown in FIG. 5, the insulating plate 22a has a bypass passage 80 connected between the fuel gas supply passage 54a and the fuel gas discharge passage 54b on a surface 78 where the recess 30a is provided. The bypass passage 80 is provided outside the recess 30a. The bypass passage 80 has a flow groove surface 80a comprising a groove having a rectangular cross section (see FIG. 2). The bypass passage 80 is connected the lowermost end of the fuel gas supply passage 54a, and connected to the fuel gas discharge passage 54b at a position above the lower end of the fuel gas discharge passage 54b. A buffer 82 for storing the condensed water is provided at the lower end of the fuel gas discharge passage 54b below the bypass passage 80.

Hydrophilic treatment is applied to the flow groove surface 80a. For example, the hydrophilic treatment to the flow groove surface 80a includes glass coating, ozone treatment, surface active agent coating, photocatalyst coating, formation of hydrophilic film, chlorination treatment, and plasma treatment. On the flow groove surface 80a, the water contact angle is 90° or less.

The bypass passage 80 extends vertically from the fuel gas supply passage 54a. Then, the bypass passage 80 is curved at an angle of substantially 90°, and connected to the fuel gas discharge passage 54b. That is, when the fuel cell stack 10 is assembled, the bypass passage 80 and the inner seals 66a, 66c of the first insulating member 62 formed on the first metal separator 38 partially overlap each other in the stacking direction.

Structure of the end separator 18a is basically the same as structure of the second metal separator 40. As shown in FIG. 1, insulating seal members 86 are provided on a surface 84 of the end separator 18a facing the insulating plate 22a, around the oxygen-containing gas supply passage 50a, the coolant supply passage 52a, the fuel gas discharge passage 54b, the fuel gas supply passage 54a, the coolant discharge passage 52b, and the oxygen-containing gas discharge passage 50b.

An insulating seal member 88 extending from the fuel gas supply passage 54a to the fuel gas discharge passage 54b is provided on the surface 84. The position of the insulating seal member 88 corresponds to the position of the bypass passage 80 of the insulating plate 22a. As shown in FIG. 2, the insulating seal member 88 includes protrusions 88a, 88b which tightly contact the surface 78 of the insulating plate 22a to cover the bypass passage 80.

The insulating seal members 86 around the fuel gas supply passage 54a and the fuel gas discharge passage 54b are cut away at the position between the protrusions 88a, 88b of the insulating seal member 88. The opposite ends of the bypass passage 80 are connected to the fuel gas supply passage 54a and the fuel gas discharge passage 54b. The insulating seal members 86, 88 are made of insulating material such as resin or rubber.

Structure of the insulating plate 22b is basically the same as structure of the insulating plate 22a. The constituent elements that are identical to those of the insulating plate 22a are labeled with the same reference numeral, and description thereof will be omitted.

Figure 6:
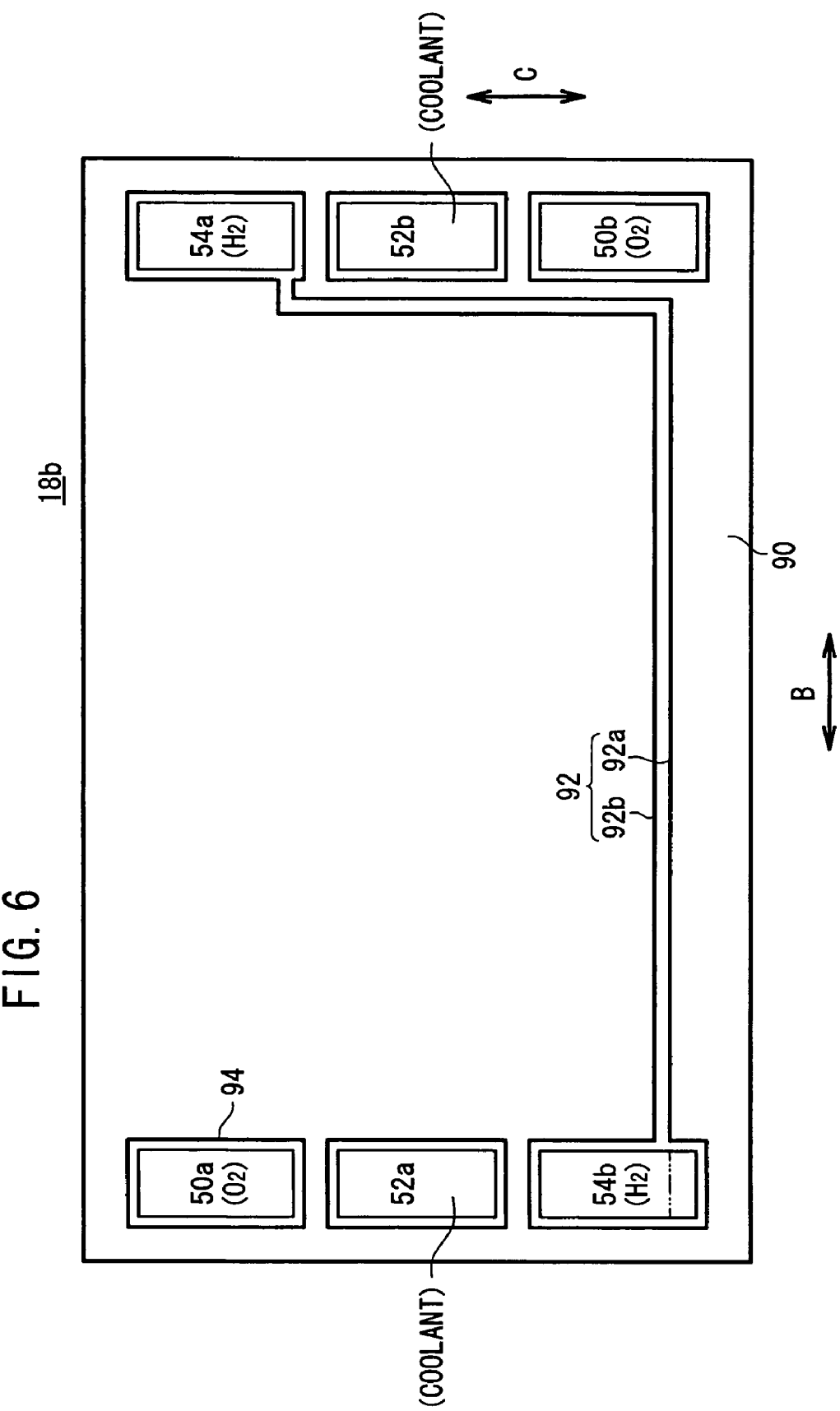
FIG. 6 is a front view showing an end separator of the fuel cell stack.

Structure of the end separator 18b is basically the same as structure of the first metal separator 38. As shown in FIGS. 2 and 6, an insulating seal member 92 is formed on a surface 90 of the end separator 18b facing the insulating plate 22b to cover the bypass passage 80. The insulating seal member 92 includes protrusions 92a, 92b on both sides of the bypass passage 80. The protrusions 92a, 92b tightly contact the insulating plate 22b. Insulating seal members 94 are formed on the surface 90 around the oxygen-containing gas supply passage 50a, the coolant supply passage 52a, the fuel gas discharge passage 54b, the fuel gas supply passage 54a, the coolant discharge passage 52b, and the oxygen-containing gas discharge passage 50b.

Operation of the fuel cell stack 10 will be described below.

Firstly, in FIG. 1, an oxygen-containing gas is supplied to the oxygen-containing gas supply passage 50a, and a fuel gas such as a hydrogen-containing gas is supplied to the fuel gas supply passage 54a. Further, a coolant such as pure water, ethylene glycol, or oil is supplied to the coolant supply passage 52a.

As shown in FIG. 3, the oxygen-containing gas flows from the oxygen-containing gas supply passage 50a into the oxygen-containing gas flow field 56 of the second metal separator 40. In the oxygen-containing gas flow field 56, the oxygen-containing gas flows back and forth in the direction indicated by the arrow B, and moves downwardly, along the cathode 46 of the membrane electrode assembly 36 for inducing an electrochemical reaction at the cathode 46.

As shown in FIGS. 3 and 4, the fuel gas flows from the fuel gas supply passage 54a into the fuel gas flow field 58 of the first metal separator 38 through the supply holes 59a. In the fuel gas flow field 58, the fuel gas flows back and forth in the direction indicated by the arrow B, and moves downwardly, along the anode 44 of the membrane electrode assembly 36 for inducing an electrochemical reaction at the anode 44.

Thus, in each of the membrane electrode assemblies 36, the oxygen-containing gas supplied to the cathode 46, and the fuel gas supplied to the anode 44 are consumed in the electrochemical reactions at catalyst layers of the cathode 46 and the anode 44 for generating electricity.

Then, the oxygen-containing gas consumed at the cathode 46 is discharged into the oxygen-containing gas discharge passage 50b, and flows in the direction indicated by the arrow A. Likewise, the fuel gas consumed at the anode 44 is discharged into the fuel gas discharge passage 54b through the discharge holes 59b, and flows in the direction indicated by the arrow A.

Further, as shown in FIG. 3, the coolant supplied to the coolant flow passage 52a flows into the coolant flow field 60 between the first metal separator 38 and the second metal separator 40, and flows in the direction indicated by the arrow B. After the coolant cools the membrane electrode assembly 36, the coolant is discharged into the coolant discharge passage 52b (see FIG. 2).

In the first embodiment, the bypass passage 80 is formed between the end separator 18a and the insulating plate 22a, at a position near the fuel gas inlet of the fuel cell stack 10. The bypass passage 80 is connected between the fuel gas supply passage 54a and the fuel gas discharge passage 54b.

Therefore, at the time of starting operation of the fuel cell stack 10 or restarting operation of the fuel cell stack 10, if the temperature of the pipe (not shown) for supplying the fuel gas to the fuel cell stack 10 is decreased to cause water condensation, the condensed water is discharged to the bypass passage 80 connected to the fuel gas supply passage 54a. Therefore, after the condensed water flows from the bypass passage 80 to the fuel gas discharge passage 54b, the condensed water is discharged from the end plate 24a to the outside.

Hydrophilic treatment is applied to the flow groove surface 80a of the bypass passage 80. Therefore, improvement in the performance of discharging the water is achieved. It is possible to prevent the condensed water from being retained in the bypass passage 80 as much as possible, and the water is discharged from the bypass passage 80 suitably.

Further, water repellent treatment is applied to the inlet section 59c provided between the fuel gas supply passage 54a and the supply holes 59a. Thus, it is possible to prevent the condensed water in the fuel gas supply passage 54a from flowing into the power generation cells 12 through the inlet section 59c. Therefore, the condensed water in the fuel gas supply passage 54a is smoothly and reliably discharged through the bypass passage 80.

In the first embodiment, the bypass passage 80 is formed on the insulating plate 22a. The insulating seal member 88 is formed on the end separator 18a stacked on the insulating plate 22a to cover the bypass passage 80 (see FIG. 2). That is, the condensed water discharged from the fuel gas supply passage 54a flows along the passage insulated by the insulating plate 22a and the insulating seal member 88. Then, the water is discharged into the fuel gas discharge passage 54b.

Thus, in the first embodiment, it is possible to prevent short circuit between the power generation cells 12 or electrical leakage to the outside of the fuel cell stack 10 through the condensed water. With a simple and compact structure, the desired power generation performance is achieved.

Further, the recess 30a for accommodating the terminal plate 20a is formed in the insulating plate 22a, and the bypass passage 80 is positioned outside the recess 30a. Therefore, the number of components of the fuel cell stack 10 is reduced economically, and reduction in the overall size of the fuel cell stack 10 is achieved easily.

Further, the insulating seal member 88 provided on the end separator 18a partially overlaps the inner seals 66a, 66c of the stack body 14 in the stacking direction. Therefore, the insulating seal member 88 functions as a seal load receiver (back receiver). The seal line is held suitably by the insulating seal member 88.

Further, in the first embodiment, the bypass passage 80 is also formed on the insulating plate 22b at a position remote from the inlet of the fuel gas supply passage 54a, and the insulating seal member 92 covers the bypass passage 80 (see FIGS. 2 and 6). In this structure, for example, when the fuel cell stack 10 is mounted on a vehicle such as an automobile, even if the stacking direction is inclined from the horizontal direction, the condensed water is discharged effectively through one of the bypass passages 80 at opposite ends of the fuel cell stack 10 in the stacking direction.

Each of the bypass passages 80 is provided at the lowermost end position of the fuel gas supply passage 54a. Therefore, the condensed water is reliably discharged from the fuel gas supply passage 54a to the bypass passage 80. The bypass passage 80 is connected to the fuel gas discharge 54b at the position spaced away from the lower end of the fuel gas discharge passage 54b. Therefore, the backflow of the condensed water from the fuel gas discharge passage 54b to the bypass passage 80 is prevented. Even if the fuel cell stack 10 is tilted, the condensed water can be discharged effectively.

Figure 7:
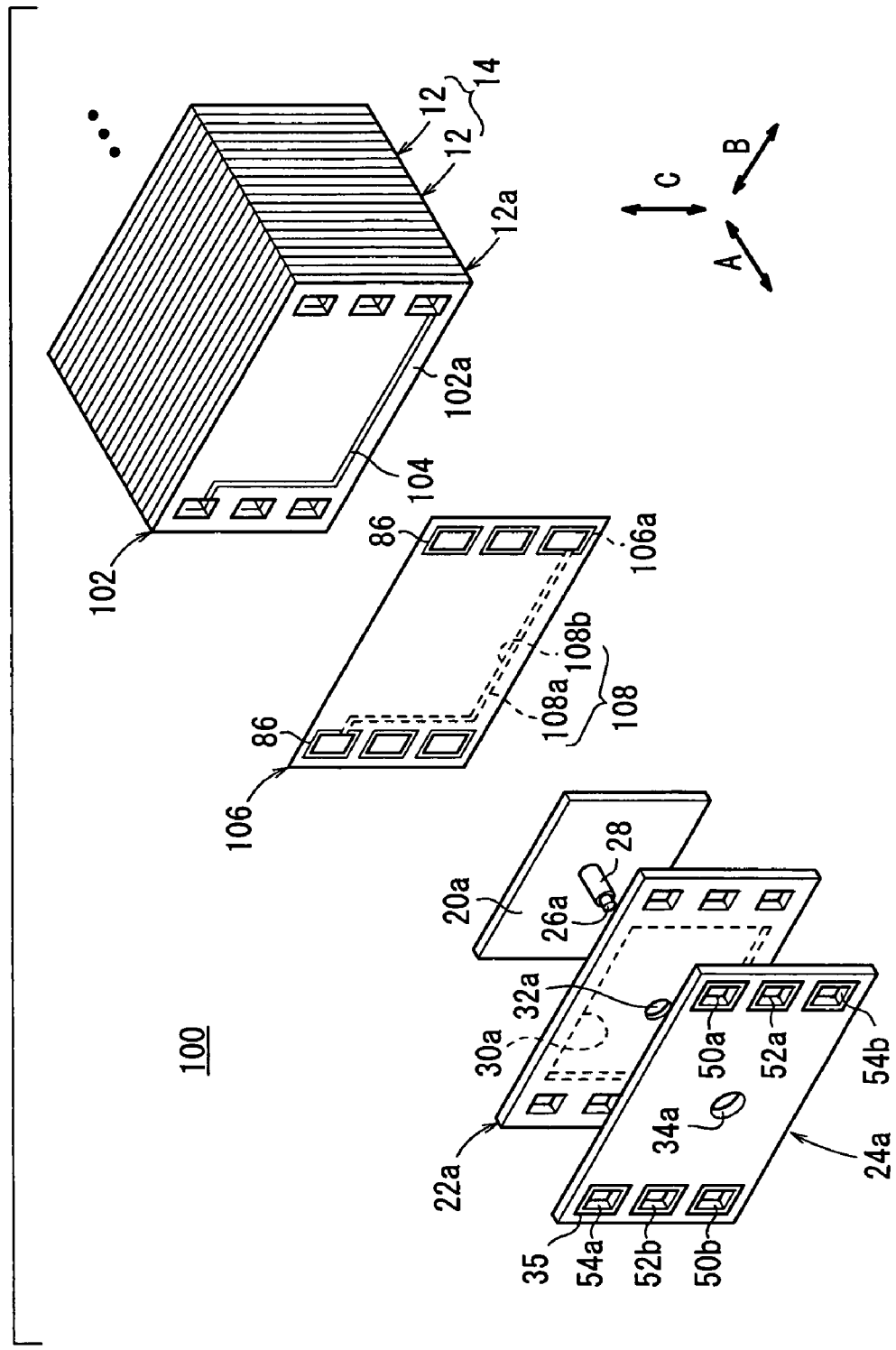
FIG. 7 is a partial exploded perspective view schematically showing a fuel cell stack according to a second embodiment of the present invention.
Figure 8:
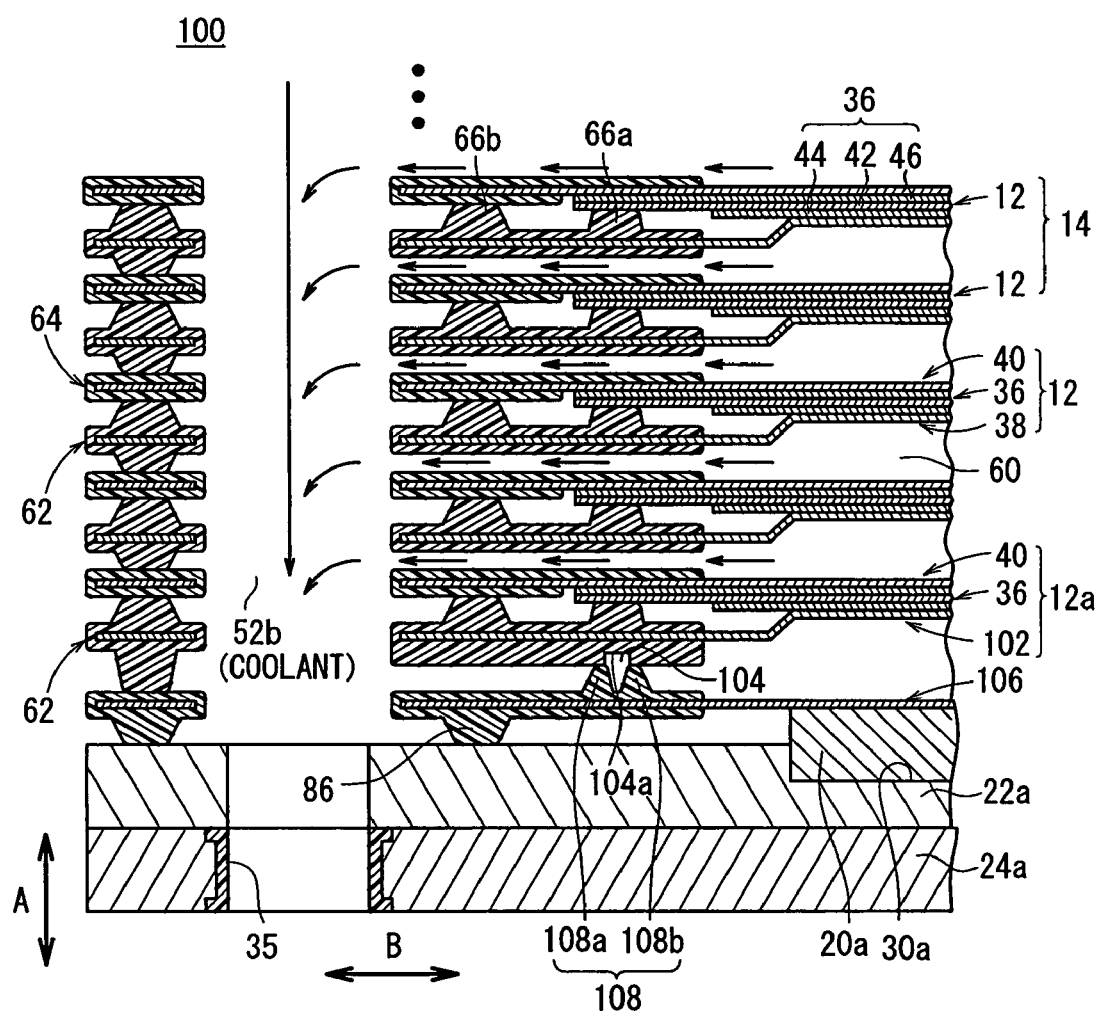
FIG. 8 is a cross sectional view showing the fuel cell stack at a position near a coolant discharge passage.

FIG. 7 is a partial exploded perspective view showing a fuel cell stack 100 according to a second embodiment of the present invention. FIG. 8 is a cross sectional view showing the fuel cell stack 100 at a position near a coolant discharge passage 52b. The constituent elements of the fuel cell stack 100 that are identical to those of the fuel cell stack 10 according to the first embodiment are labeled with the same reference numeral, and description thereof will be omitted.

The fuel cell stack 100 includes the stack body 14, and at one end of the stack body 14 in the stacking direction, an end cell 12a such as an end power generation cell or a dummy cell (a cell which has the same structure as the power generation cell 12, but does not perform power generation) is provided. The end cell 12a has the membrane electrode assembly 36 (or a member which has the same shape as the membrane electrode assembly 36) and first and second metal separators 102, 40.

A bypass passage 104 is formed on an outer surface 102a of the first metal separator 102 by cutting out a first insulating member 62. The bypass passage 104 is connected between the fuel gas supply passage 54a and the fuel gas discharge passage 54b. Hydrophilic treatment is applied to the first insulating member 62, on a flow groove surface 104a of the bypass passage 104. For example, hydrophilic coating material is applied to the flow groove surface 104a, or hydrophilic material is mixed with the material of the flow groove surface 104a to achieve the desired hydrophilic property.

Figure 9:
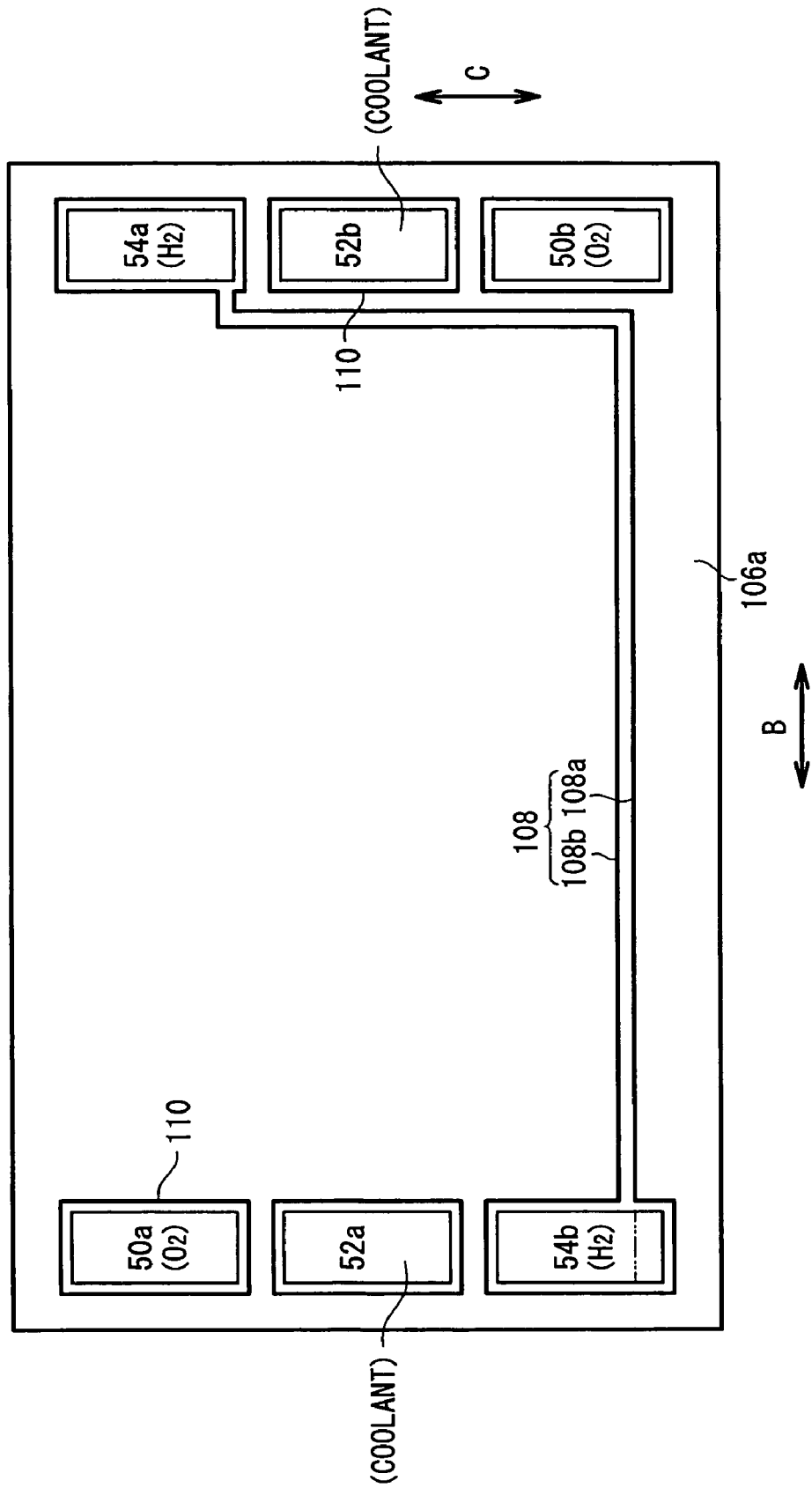
FIG. 9 is a front view showing an end separator of the fuel cell stack.
Figure 10:
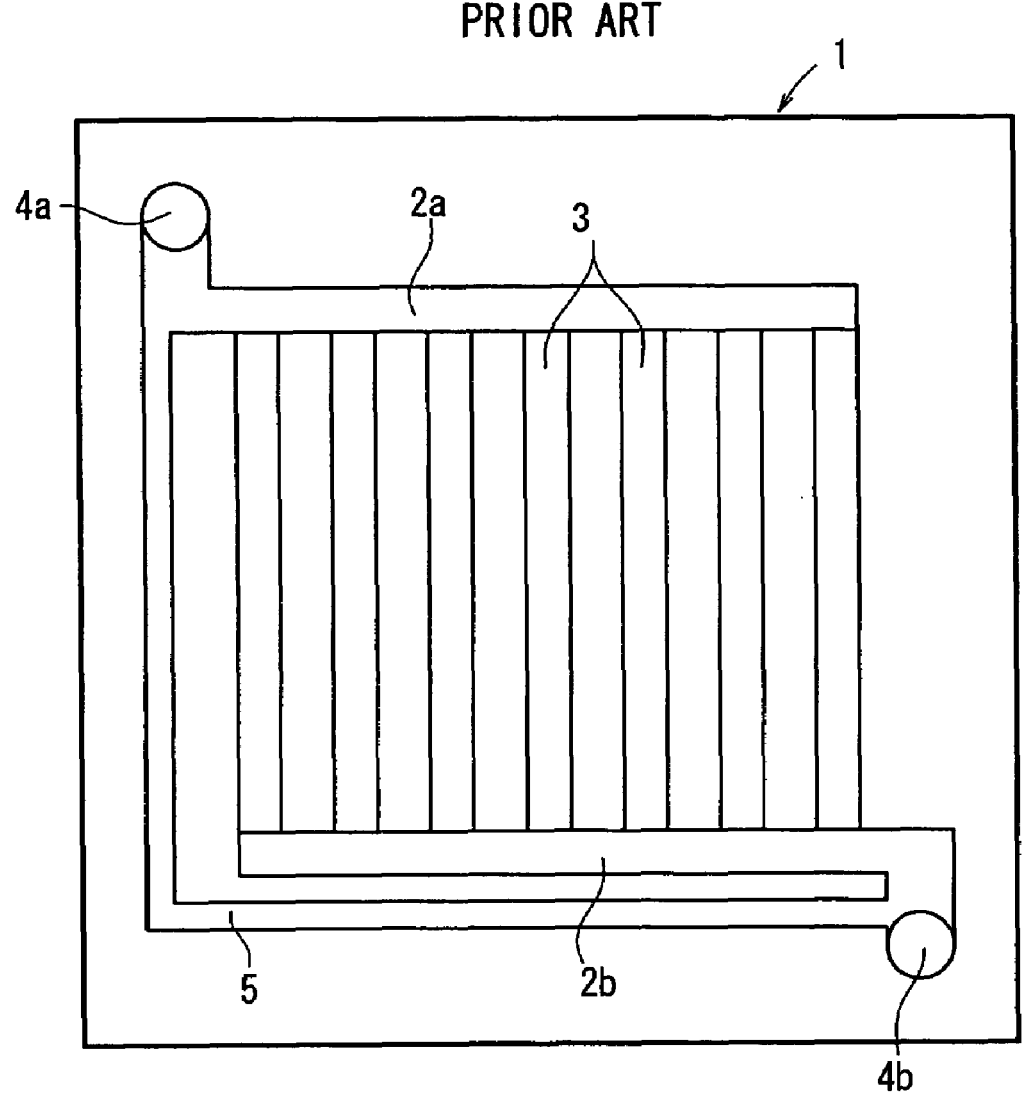
FIG. 10 is a front view showing a separator of a conventional polymer electrolyte fuel cell.

An end separator 106 is interposed between the end cell 12a and the insulating plate 22a. The end separator 106 has an insulating seal member 108 on a surface 106a facing the first metal separator 102 of the end cell 12a to cover the bypass passage 104 (see FIGS. 8 and 9). The insulating seal member 108 has protrusions 108a, 108b. The protrusions 108a, 108b are provided on both sides of the bypass passage 104, and tightly contact the surface 102a of the first metal separator 102. Hydrophilic treatment may be applied to the surface between the protrusions 108a, 108b.

The bypass passage 104 may have various shapes in the surface 102a. In the second embodiment, as in the case of the first embodiment, the shape of the bypass passage 104 is determined such that the insulating seal member 108 partially overlaps the inner seals 66a, 66c in the stacking direction.

In the second embodiment, the water flowing into the fuel gas supply passage 54a is discharged through the bypass passage 104 smoothly. The bypass passage 104 is covered with the insulating seal member 108. Therefore, the condensed water flows through the insulated bypass passage 104. It is possible to prevent short circuit between the power generation cells 12, and electrical leakage to the outside of the fuel cell stack 100 through the condensed water.

Further, hydrophilic treatment is applied to the flow groove surface 104a of the bypass passage 104. Therefore, the same advantages as in the case of the first embodiment can be achieved. For example, improvement in the performance of discharging the water is achieved. It is possible to prevent the condensed water from being retained in the bypass passage 104 as much as possible, and the water is discharged from the bypass passage 104 suitably.

In the first and second embodiments, the bypass passage 80 or the bypass passage 104 is provided between the fuel gas supply passage 54a and the fuel gas discharge passage 54b. However, the present invention is not limited in this respect. For example, a bypass passage having the same structure as the bypass passage 80 or the bypass passage 104 may be provided between the oxygen-containing gas supply passage 50a and the oxygen-containing gas discharge passage 50b.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack comprising a stack body formed by stacking a plurality of electrolyte electrode assemblies and separators alternately in a stacking direction, said electrolyte electrode assemblies each including a pair of electrodes, and an electrolyte interposed between said electrodes, a reactant gas supply passage and a reactant gas discharge passage for at least one reactant gas extending through said stack body in the stacking direction, said fuel cell stack further comprising:

terminal plates, insulating plates, and end plates provided at opposite ends of said stack body, wherein a bypass passage is formed between said stack body and said end plate, and said bypass passage is connected between said reactant gas supply passage and said reactant gas discharge passage, and said bypass passage is covered with an insulating seal member, an end separator is provided at an end of said stack body, a recess for accommodating said terminal plate is provided at the center of said insulating plate, and said bypass passage is formed between said insulating plate and said end separator, and provided outside said recess, a groove forming said bypass passage is provided on said insulating plate, and said end separator has said insulating seal member on a metal plate, and said insulating seal member includes a pair of protrusions which cover said bypass passage, and tightly contact said insulating plate.

2. A fuel cell stack comprising a stack body formed by stacking a plurality of electrolyte electrode assemblies and separators alternately in a stacking direction, said electrolyte electrode assemblies each including a pair of electrodes, and an electrolyte interposed between said electrodes, a reactant gas supply passage and a reactant gas discharge passage for at least one reactant gas extending through said stack body in the stacking direction, said fuel cell stack further comprising:

terminal plates, insulating plates, and end plates provided at opposite ends of said stack body, wherein a bypass passage is formed between said stack body and said end plate, and said bypass passage is connected between said reactant gas supply passage and said reactant gas discharge passage, said bypass passage is covered with an insulating seal member, an end separator is provided at an end of said stack body, and said bypass passage is formed between said end separator and said stack body, an end cell of said stack body includes a separator having said bypass passage, and said end separator has said insulating seal member on a metal plate, and said insulating seal member includes a pair of protrusions which cover said bypass passage, and tightly contact said separator.

3. A fuel cell stack according to claim 1, wherein said separator of said stack body has a seal member around a reactant gas flow field for supplying the reactant gas along an electrode surface, and said insulating seal member partially overlaps said seal member in the stacking direction.

4. A fuel cell stack according to claim 1, wherein a reactant gas flow field connected to said reactant gas supply passage and said reactant gas discharge passage for supplying the reactant gas to said electrode is provided, and water repellent treatment is applied to an inlet section for supplying the reactant gas from said reactant gas supply passage to said reactant gas flow field.

5. A fuel cell stack according to claim 1, wherein hydrophilic treatment is applied to a flow groove surface of said bypass passage.

6. A fuel cell stack according to claim 1, wherein said bypass passage is connected to a lowermost end of said reactant gas supply passage, and connected to said reactant gas discharge passage at a position above a lower end of said reactant gas discharge passage, and a buffer is provided at a lower end of said reactant gas discharge passage.

7. A fuel cell stack according to claim 2, wherein said separator of said stack body has a seal member around a reactant gas flow field for supplying the reactant gas along an electrode surface, and said insulating seal member partially overlaps said seal member in the stacking direction.

8. A fuel cell stack according to claim 2, wherein a reactant gas flow field connected to said reactant gas supply passage and said reactant gas discharge passage for supplying the reactant gas to said electrode is provided, and water repellent treatment is applied to an inlet section for supplying the reactant gas from said reactant gas supply passage to said reactant gas flow field.

9. A fuel cell stack according to claim 2, wherein hydrophilic treatment is applied to a flow groove surface of said bypass passage.

10. A fuel cell stack according to claim 2, wherein said bypass passage is connected to a lowermost end of said reactant gas supply passage, and connected to said reactant gas discharge passage at a position above a lower end of said reactant gas discharge passage, and a buffer is provided at a lower end of said reactant gas discharge passage.

\* \* \* \* \*